US008649627B2

(12) United States Patent
Albu et al.

(10) Patent No.: US 8,649,627 B2
(45) Date of Patent: Feb. 11, 2014

(54) IMAGE PROCESSING METHOD AND APPARATUS

(71) Applicant: DigitalOptics Corporation Europe Limited, Galway (IE)

(72) Inventors: Felix Albu, Bucharest (RO); Eran Steinberg, San Francisco, CA (US); Peter Corcoran, Claregalway (IE); Alexandru Drimbarean, Galway (IE); Adrian Zamfir, Bucharest (RO); Corneliu Florea, Bucharest (RO); Vlad Poenaru, Bucharest (RO)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 0 days.

(21) Appl. No.: 13/772,323

(22) Filed: Feb. 20, 2013

(65) Prior Publication Data

US 2013/0236094 A1    Sep. 12, 2013

Related U.S. Application Data

(63) Continuation of application No. 11/856,721, filed on Sep. 18, 2007, now Pat. No. 8,417,055.

(60) Provisional application No. 60/893,116, filed on Mar. 5, 2007.

(51) Int. Cl.
*G06K 9/40* (2006.01)

(52) U.S. Cl.
USPC ............................ 382/255; 382/275; 382/167

(58) Field of Classification Search
USPC ......................................... 382/275, 255, 167
See application file for complete search history.

(56) References Cited

U.S. PATENT DOCUMENTS 6,741,960 B2    5/2004    Kim et al.
7,072,525 B1    7/2006    Covell
(Continued)

FOREIGN PATENT DOCUMENTS

EP        1583033 A2      10/2005
JP      2005-352721 A     12/2005
(Continued)

OTHER PUBLICATIONS

PCT Notification of Transmittal of the International Search Report and the Written Opinion of the International Arching Authority, or the Declaration, for PCT Application No. PCT/EP2010/056999, report dated Sep. 1, 2010, 10 Pages.
(Continued)

*Primary Examiner* — Chan S Park
*Assistant Examiner* — Mark Roz
(74) *Attorney, Agent, or Firm* — Hickman Palermo Truong Becker Bingham Wong LLP

(57) ABSTRACT

A method and apparatus for providing image processing. For one embodiment of the invention, an image processing apparatus is arranged to process a first relatively underexposed and sharp image of a scene, and a second relatively well exposed and blurred image, nominally of the same scene, the first and second images being derived from respective image sources. The apparatus provides a portion of the relatively first underexposed image as an input signal to an adaptive filter; and a corresponding portion of the second relatively well exposed image as a desired signal to the adaptive filter. The adaptive filter produces an output signal from the input signal and the desired signal; and an image generator constructs a first filtered image from the output signal, relatively less blurred than the second image.

15 Claims, 10 Drawing Sheets

(56) References Cited

U.S. PATENT DOCUMENTS

| | | |
|---|---|---|
| 7,636,486 B2 | 12/2009 | Steinberg et al. |
| 7,639,888 B2 | 12/2009 | Steinberg et al. |
| 7,639,889 B2 | 12/2009 | Steinberg et al. |
| 7,657,172 B2 | 2/2010 | Nomura et al. |
| 7,660,478 B2 | 2/2010 | Steinberg et al. |
| 7,676,108 B2 | 3/2010 | Steinberg et al. |
| 7,697,778 B2 | 4/2010 | Steinberg et al. |
| 8,169,486 B2 | 5/2012 | Corcoran et al. |
| 8,199,222 B2 | 6/2012 | Drimbarean et al. |
| 8,264,576 B2 | 9/2012 | Susanu et al. |
| 8,351,726 B2 | 1/2013 | Albu et al. |
| 8,417,055 B2 | 4/2013 | Albu et al. |
| 8,494,299 B2 | 7/2013 | Steinberg et al. |
| 8,494,300 B2 | 7/2013 | Steinberg et al. |
| 8,520,082 B2 | 8/2013 | Corcoran et al. |
| 2004/0061796 A1 | 4/2004 | Honda et al. |
| 2004/0066981 A1 | 4/2004 | Li et al. |
| 2004/0130628 A1 | 7/2004 | Stavely |
| 2004/0145659 A1 | 7/2004 | Someya et al. |
| 2005/0248660 A1 | 11/2005 | Stavely et al. |
| 2006/0017837 A1 | 1/2006 | Sorek et al. |
| 2006/0098237 A1 | 5/2006 | Steinberg et al. |
| 2006/0098890 A1 | 5/2006 | Steinberg et al. |
| 2006/0098891 A1 | 5/2006 | Steinberg et al. |
| 2006/0119710 A1 | 6/2006 | Ben-Ezra et al. |
| 2006/0125938 A1 | 6/2006 | Ben-Ezra et al. |
| 2006/0133688 A1 | 6/2006 | Kang et al. |
| 2006/0187308 A1 | 8/2006 | Lim et al. |
| 2006/0227249 A1 | 10/2006 | Chen et al. |
| 2006/0279639 A1 | 12/2006 | Silverstein et al. |
| 2007/0009169 A1 | 1/2007 | Bhattacharjya |
| 2007/0058073 A1 | 3/2007 | Steinberg et al. |
| 2007/0083114 A1 | 4/2007 | Yang et al. |
| 2007/0097221 A1 | 5/2007 | Stavely et al. |
| 2007/0171987 A1 | 7/2007 | Trimeche |
| 2007/0216777 A1 | 9/2007 | Quan et al. |
| 2007/0268388 A1 | 11/2007 | Watanabe et al. |
| 2007/0296833 A1 | 12/2007 | Corcoran et al. |
| 2008/0166115 A1 | 7/2008 | Sachs et al. |
| 2008/0218611 A1 | 9/2008 | Parulski et al. |
| 2008/0219581 A1 | 9/2008 | Albu et al. |
| 2008/0240607 A1 | 10/2008 | Sun et al. |
| 2008/0259175 A1 | 10/2008 | Muramatsu et al. |
| 2008/0267530 A1 | 10/2008 | Lim |
| 2009/0009612 A1 | 1/2009 | Tico et al. |
| 2009/0167893 A1 | 7/2009 | Susanu et al. |
| 2009/0179999 A1 | 7/2009 | Albu et al. |
| 2009/0185041 A1 | 7/2009 | Kang et al. |
| 2009/0284610 A1 | 11/2009 | Fukumoto et al. |
| 2010/0026823 A1 | 2/2010 | Sawada |
| 2010/0053349 A1 | 3/2010 | Watanabe et al. |
| 2010/0201826 A1 | 8/2010 | Steinberg et al. |
| 2010/0201827 A1 | 8/2010 | Steinberg et al. |
| 2011/0043548 A1 | 2/2011 | Knapp et al. |
| 2011/0050919 A1 | 3/2011 | Albu et al. |
| 2011/0090352 A1 | 4/2011 | Wang et al. |
| 2011/0102638 A1 | 5/2011 | Susanu et al. |
| 2011/0102642 A1 | 5/2011 | Wang et al. |
| 2011/0205381 A1 | 8/2011 | Drimbarean et al. |

FOREIGN PATENT DOCUMENTS

| | | |
|---|---|---|
| WO | 01/13171 A1 | 2/2001 |
| WO | 2006/050782 A1 | 5/2006 |
| WO | 2010/145910 A1 | 12/2010 |

OTHER PUBLICATIONS

PCT Notification Concerning Transmittal of International Preliminary Report on Patentability (Chapter 1 of the Patent Cooperation Treaty) (PCT Rule 44bis.1(c)), for PCT Application No. PCT/EP2010/056999, report dated Dec. 29, 2011, 8 Pages.

Deever A: "In-camera all-digital video stabilization", Proceedings of the inter. con. on decisionsupport systems, Proceedigns of ISDSS, 1, Jan. 2006, pp. 190-193, XP009106923.

Demir B et al: "Block motion estimation using adaptive modified two-bit transform" Jun. 5, 2007, vol. 1, No. 2, Jun. 5, 2007, pp. 215-222, XP006028790.

Xinqiao Liu and Abbas El Gamal, Photocurrent Estimation from Multiple Non-destructive Samples in a CMOS Image Sensor, In Proceedings of the SPIE Electronic Imaging '2001 conference, vol. 4306, San Jose, CA, Jan. 2001. pp. 450-458.

John C. Russ: Chapter 3: Correcting Imaging Defects. In the Image Processing Handbook, 2002, by CRC Press, LLC. 75 Pages.

Moshe Ben-Ezra, Shree K. Nayar, Motion Deblurring Using Hybrid Imaging, CVPR, vol. 1, 2003 IEEE Computer Society Conference on Computer Vision and Pattern Recognition (CVPR '03)—vol. 1, 2003, 8 Pages.

Mejdi Trimeche, Dmitry Paliyb, Markku Vehvilainena, Vladimir Katkovnikb, Multichannel image deblurring of raw color components, Computational Imaging III. Edited by Bouman, Charles A.; Miller, Eric L. Proceedings of the SPIE, vol. 5674, pp. 169-178 (2005).

Jannson, Peter A: "Deconvolution of Images and Spectra" 2nd. Edition, Academic Press, 1997.

Patent Abstracts of Japan, publication No. 2005-352721, publication date: Dec. 22, 2005, for: Imaging Device.

Shiciian Wu, Zhongkang Lu, Ee Ping Ong, Weisi Lin, "Blind Image Blur Identification in Cepstrum Domain", IEEE Proceedings of 16th International Conference on Computer Communications and Networks, 2007, pp. 1166-1171.

Eric P Bennett, Leonard McMillan, Video Enhancement Using Per-Pixel Virtual Exposures, ACM Transactions on Graphics: TOG, Jan. 1, 2005, ACM, US, pp. 845-852, XP2477673A.

Chen-Kuei, Yang; Tsu-Chin, Wu; Ja-Chen, Lin; Wen-Hsiang, Tsai; Color image sharpening by moment-preserving technique, Signal Processing, Sep. 1, 1995, Elsevier Science Publishers B.V. Amsterdam, NL, vol. 45, No. 3, pp. 397-403, XP4002600A.

Oppenheim A V, Lim J S, The Importance of Phase in Signals, Proceedings of the IEEE, May 1, 1981, IEEE. New York, US, vol. 69, No. 5, pp. 529-541, XP008060042.

Michael Elad, Arie Feuer, Superresolution Restoration of an Image Sequence: Adaptive Filtering Approach, IEEE Transactions on Image Processing, Mar. 1, 1999, IEEE Service Center, Piscataway, NJ, US, vol. 8, No. 3, XP11026284A.

Fujita K, Kurahashi S, Yoshida Y, An edge-adaptive iterative method for image restoration, Singapore ICCS/ISITA '92. 'Communications on the Move' Singapore Nov. 16-20, 1992, Nov. 16, 1992; 19921116-19921120 New York, NY, USA, IEEE, US, XP10066997A.

IMAGE PROCESSING METHOD AND APPARATUS

CLAIM OF PRIORITY

This application is a Continuation of U.S. Patent Application Ser. No. 11/856,721, filed Sep. 18, 2007, now U.S. Pat. No. 8,417,055; which claims priority to U.S. Provisional Application Ser. No. 60/893,116, filed on Mar. 5, 2007, entitled "Sliding Adaptive Method Using Both a Preview Picture and a Full Resolution Picture" which is hereby incorporated by reference in it its entirety.

FIELD

Embodiments of the invention relate generally to the field of image processing and methods and apparatuses for effecting image processing.

BACKGROUND

Conventional image processing techniques include using two source images nominally of the same scene to produce a single target image of better quality or higher resolution than either of the source images.

In super-resolution, multiple differently exposed lower resolution images can be combined to produce a single higher resolution image of a scene, for example, as disclosed in "High-Resolution Image Reconstruction from Multiple Differently Exposed Images", Gunturk et al., IEEE Signal Processing Letters, Vol. 13, No. 4, April 2006; or "Optimizing and Learning for Super-resolution", Lyndsey Pickup et al, BMVC 2006, 4-7 Sep. 2006, Edinburgh, UK. However, in super-resolution, blurring of the individual source images either because of camera or subject motion are usually not of concern before the combination of the source images.

U.S. Pat. No. 7,072,525 discloses adaptive filtering of a target version of an image that has been produced by processing an original version of the image to mitigate the effects of processing including adaptive gain noise, up-sampling artifacts or compression artifacts.

PCT Application No. PCT/EP2005/011011 (Ref: FN109) discloses using information from one or more presumed-sharp short exposure time (SET) preview images to calculate a motion function for a fully exposed higher resolution main image to assist in the de-blurring of the main image.

Indeed many other documents, including US 2006/0187308, Suk Hwan Lim et al.; and "Image Deblurring with Blurred/Noisy Image Pairs", Lu Yuan et al, SIGGRAPH07, Aug. 5-9, 2007, San Diego, Calif. are directed towards attempting to calculate a blur function in the main image using a second reference image before de-blurring the main image.

Other approaches, such as disclosed in US2006/0017837 have involved selecting information from two or more images, having varying exposure times, to reconstruct a target image where image information is selected from zones with high image details in SET images and from zones with low image details in longer exposure time images.

SUMMARY

In accordance with one embodiment of the invention, a first image, which is a relatively underexposed, sharp image of a scene, is obtained. A second image, which is a relatively well exposed, blurred image, is obtained. The first image and the second image are nominally of the same scene. The first image and the second image are derived from respective image sources. A portion of the first image is provided as an input signal to an adaptive filter. A corresponding portion of the second image is provided as a desired signal to the adaptive filter. The input signal is adaptively filtered to produce an output signal. A first filtered image is constructed from the output signal. The first filtered image is less blurred than the second image.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Methods and apparatuses are disclosed that provide an improved image processing. Embodiments of the invention provide a method of combining a sharp image and a blurred image of differing resolution and exposure to produce a relatively high resolution, fully exposed and relatively sharp image. In accordance with various embodiments of the invention, processes are disclosed that provide effective image processing. In accordance with one embodiment of the invention, a first image, which is a relatively underexposed, sharp image of a scene, is obtained. A second image, which is a relatively well exposed, blurred image, is obtained. The first image and the second image are nominally of the same scene. The first image and the second image are derived from respective image sources. A portion of the first image is provided as an input signal to an adaptive filter. A corresponding portion of the second image is provided as a desired signal to the adaptive filter. The input signal is adaptively filtered to produce an output signal. A first filtered image is constructed from the output signal. The first filtered image is less blurred than the second image.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable to wide range of systems in which image processing is effected.

Figure 1:
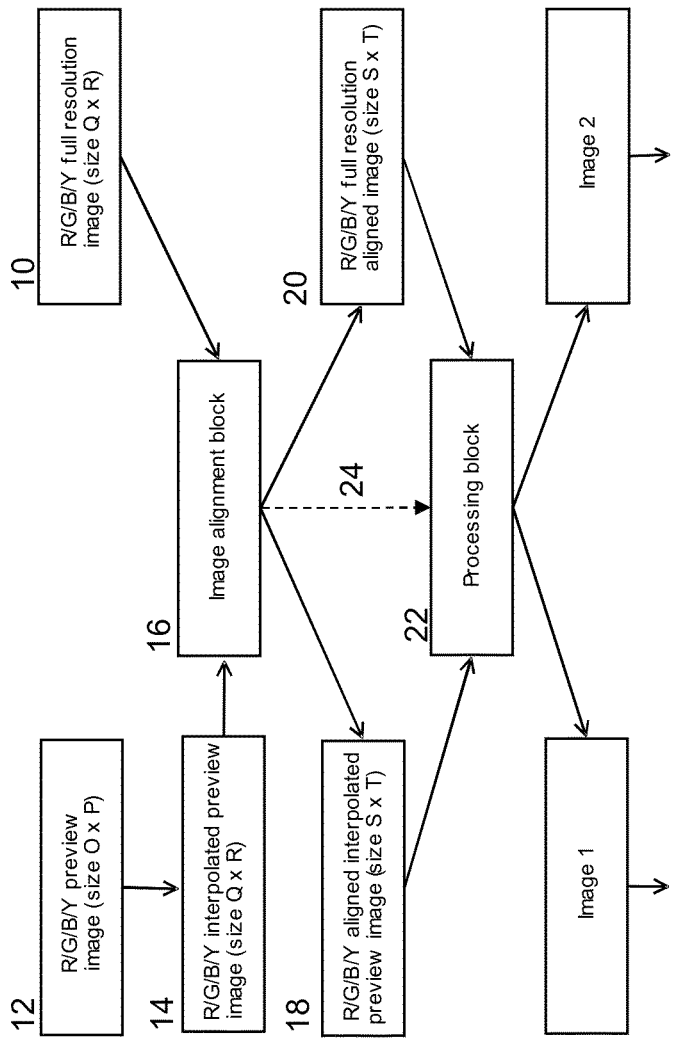
FIG. 1 illustrates a process for effecting image processing in accordance with one embodiment of the invention.

Referring now to FIG. 1, in a first embodiment of the present invention, a well-exposed blurred relatively low resolution image 12 and a sharp but under-exposed full resolution image 10 are available for processing with a view to combining the images to produce an improved quality full resolution image.

The size of the lower resolution image 12 is O×P and the size of the under-exposed full resolution image 10 is Q×R, with O<Q and P<R.

Where the images are acquired in a digital image acquisition device such as a digital stills camera, camera phone or digital video camera, the lower resolution image 12 may be a preview image of a scene acquired soon before or after the acquisition of a main image comprising the full resolution image 10, with the dimensions of the preview and full resolution images depending on the camera type and settings. For example, the preview size can be 320×240 (O=320; P=240) and the full resolution image can be much bigger (e.g. Q=3648; R=2736).

In accordance with the present invention, adaptive filtering (described in more detail later) is applied to the (possibly pre-processed) source images 10, 12 to produce an improved filtered image. Adaptive filtering requires an input image (referred to in the present specification as x(k)) and a desired image (referred to in the present specification as d(k)) of the same size, with the resultant filtered image (referred to in the present specification as y(k)) having the same size as both input and desired images.

As such, in the preferred embodiment, the preview image is interpolated to the size Q×R of the full resolution image.

It will be seen that in interpolating the preview image, a misalignment between the interpolated image 14 and the full resolution image might exist. As such, in the preferred embodiment, the images are aligned 16 to produce an aligned interpolated preview image 18 and an aligned full resolution image 20. Any known image alignment procedure can be used, for example, as described in Kuglin C D., Hines D C. "The phase correlation image alignment method", Proc. Int. Conf. Cybernetics and Society, IEEE, Bucharest, Romania, September 1975, pp. 163-165.

Other possible image registration methods are surveyed in "Image registration methods: a survey", Image and Vision Computing 21 (2003), 977-1000, Barbara Zitova and Jan Flusser.

Alternatively, the displacements between the images 10 and 12/14 can be measured if camera sensors producing such a measure are available.

In any case, either before or during alignment, the full resolution image can be down-sampled to an intermediate size S×T with the preview image being interpolated accordingly to produce the input and desired images of the required resolution, so that after alignment 16, the size of the aligned interpolated image and the aligned full resolution image will be S×T (S≤Q, T≤R).

These images are now subjected to further processing 22 to compute the input and desired images (IMAGE 1 and IMAGE 2) to be used in adaptive filtering after a decision is made based on the displacement value(s) provided from image alignment 16 as indicated by the line 24.

In real situations, there may be relatively large differences between the images 10, 14, with one image being severely blurred and the other one being under-exposed. As such, alignment may fail to give the right displacement between images.

If the displacement values are lower than a specified number of pixels (e.g. 20), then the full resolution aligned image 20 is used as IMAGE 1 and the aligned interpolated preview image 18 is used as IMAGE 2.

Otherwise, if the displacement values are higher than the specified number of pixels, several alternatives are possible for IMAGE 2, although in general these involve obtaining IMAGE 2 by combining the interpolated preview image 14 and the full resolution image 10 in one of a number of manners.

Figure 2:
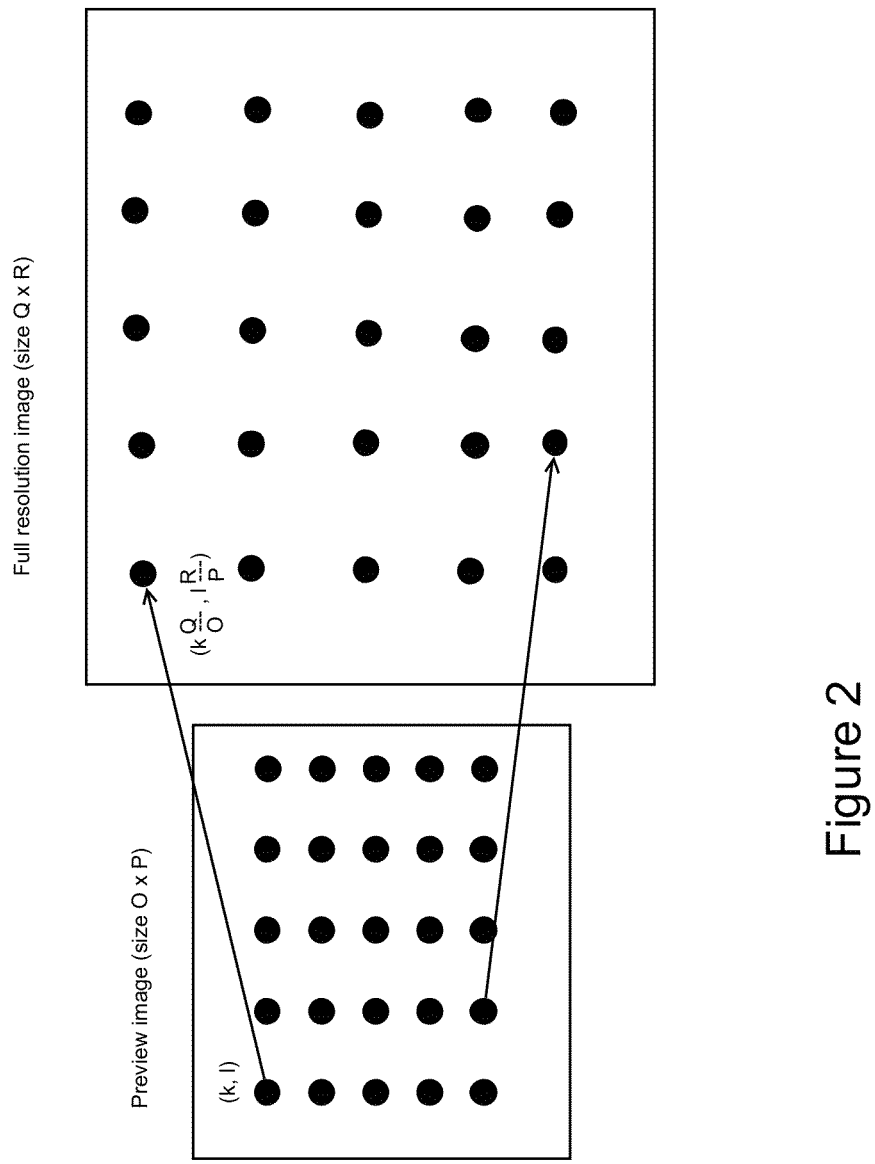
FIG. 2 illustrates corresponding grid points from a preview and a full resolution image used in the image processing method of FIG. 1 in accordance with one embodiment of the invention.

In a first implementation, we compute two coefficients $c_1$ and $c_2$ and the pixel values of IMAGE 2 are obtained by multiplying the pixel values of the full resolution image 10 with $c_1$ and adding $c_2$. These coefficients are computed using a linear regression and a common form of linear regression is least square fitting (G. H. Golub and C. F. Van Loan, Matrix Computations. John Hopkins University Press, Baltimore, Md., 3rd edition, 1996). Referring to FIG. 2, a grid comprising for example 25 points is chosen from the preview image 12 and the corresponding 25 grid points from the full resolution image 10. If one pixel of the preview image has the coordinates (k, l), the corresponding chosen pixel from the full resolution image has the coordinates $$\left(\left(k \cdot \frac{Q}{O}, l \cdot \frac{R}{P}\right)\right).$$

Therefore we obtain two 5×5 matrices, $M_1$ that corresponds to the pixel values chosen from the preview image and $M_2$ that corresponds to the pixel values chosen from the full resolution image. Two vectors are obtained from the pixel values of these matrices by column-wise ordering of $M_1$ ($a=(a_i)$ and $M_2$ $b=(b_i)$). We therefore have pairs of data $(a_i,b_i)$ for $i=1,2,\ldots,n$, where $n=25$ is the total number of grid points from each image. We define the matrix $$V = \begin{pmatrix} a_1 1 \\ a_2 1 \\ \vdots \\ a_n 1 \end{pmatrix}.$$

The coefficient vector $c=[c_1\ c_2]$ is obtained by solving the linear system $V^T V c = V^T b$. The linear system can be solved with any known method.

Another alternative is to amplify the pixels of the under-exposed image 10 with the ratio of average values of the 25 grid points of both images 10, 12 and rescale within the [0-255] interval for use as IMAGE 2.

In a still further alternative, IMAGE 2 is obtained by combining the amplitude spectrum of the interpolated blurred preview image 14 and the phase of the under-exposed full resolution image 10. As such, IMAGE 2 will be slightly deblurred, with some color artifacts, although it will be aligned with the under-exposed image 10. This should produce relatively fewer artifacts in the final image produced by adaptive filtering.

Alternatively, instead of computing FFTs on full resolution images to determine phase values, an intermediate image at preview resolution can be computed by combining the amplitude spectrum of the blurred image 12 and the phase of a reduced sized version of the under-exposed image 10. This can then be interpolated to produce IMAGE 2.

Another possibility is to use as IMAGE 2, a weighted combination of image 20 and image 18, e.g. 0.1*(Image 18)+0.9*(Image 20). This can be used if the preview image 12 has large saturated areas.

Figure 3:
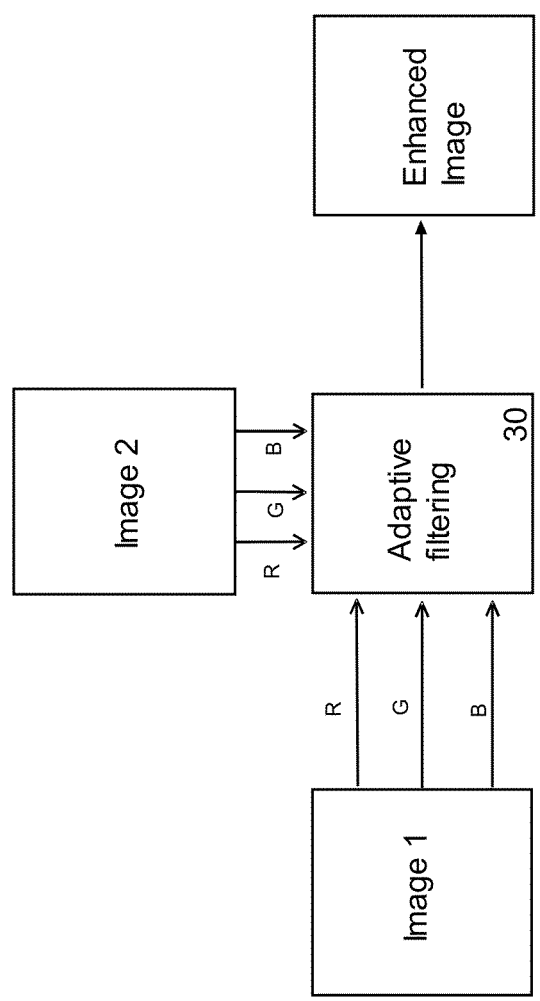
FIG. 3 illustrates an adaptive filtering of images in R/G/B color space in accordance with one embodiment of the invention.
Figure 4:
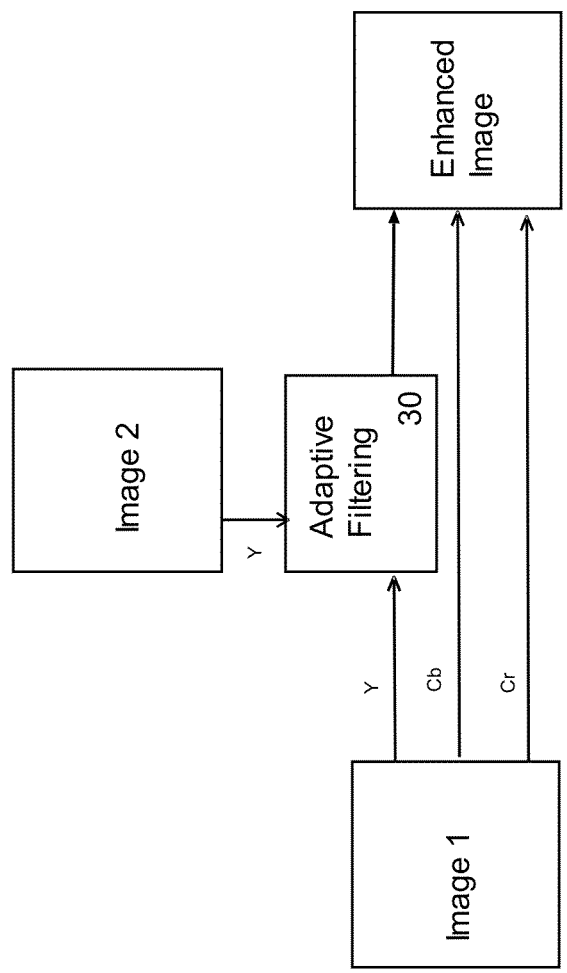
FIG. 4 illustrates an adaptive filtering of images in YCbCr color space in accordance with one embodiment of the invention.

In any case, once the processing 22 is complete, two images of similar size are available for adaptive filtering 30, FIGS. 3&4.

In a first implementation, the input and desired images are in RGB color space, FIG. 3, whereas in another implementation the input and desired images are in YCC space, FIG. 4. For the RGB case, one color plane (e.g. G plane) is selected from both images and the computed filter coefficients from adaptive filtering are used to update the pixel values for all color planes. The filter coefficients $w(k)$ are obtained at each iteration of the filter 36. The updated pixel value for all color planes will be $y_G(k)=w(k)\cdot x_G(k)$, $y_R(k)=w(k)\cdot x_R(k)$, $y_B(k)=w(k)\cdot x_B(k)$, where $x_R(k)$, $x_G(k)$, $x_B(k)$ are the sliding vectors 32 for the R,G,B planes respectively. This provides a solution of reduced numerical complexity vis-à-vis filtering all three color planes.

In the YCC case, the Y plane is selected with the Cb and Cr planes being left unchanged.

Figure 5A:
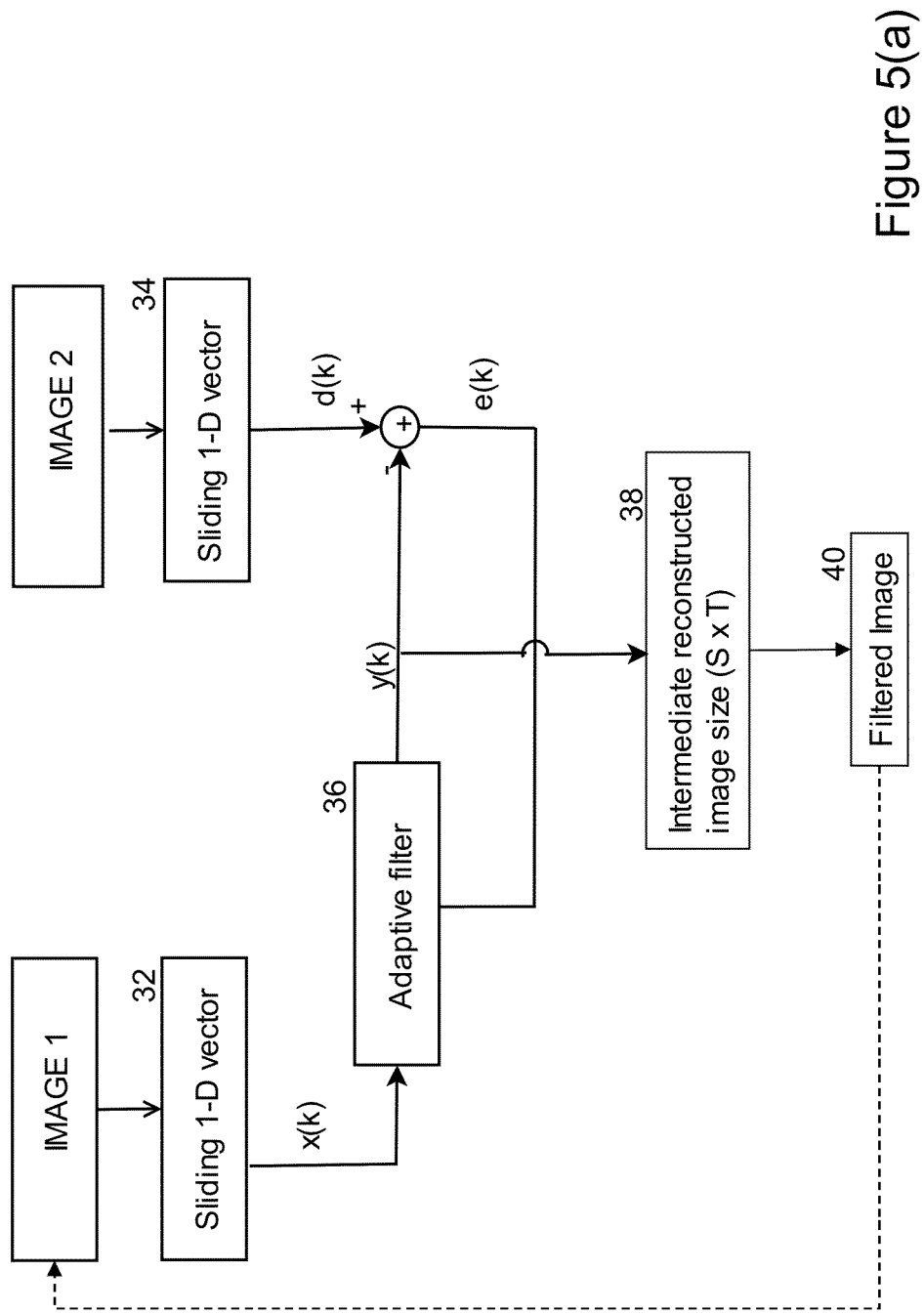
FIGS. 5a and 5b illustrate an adaptive filtering of images in accordance with various alternative embodiments of the invention.

Referring now to FIG. 5(a), where the adaptive filtering of FIGS. 3 and 4 is shown in more detail. Two sliding one-dimensional vectors 32, 34 with the dimension L are created, L being the length of the adaptive filter. Within the adaptive filter, the input signal $x(k)$ is the first vector signal 32, while the desired signal $d(k)$ is second vector 34.

In the simplest implementation, L=1 and this can be used if the original image acquisition device can provide good quality under-exposed pictures with a low exposure time. Where the acquisition device produces low quality and noisy under-exposed images, a longer filter length L should be chosen (e.g. 2 or 3 coefficients).

Figure 6:
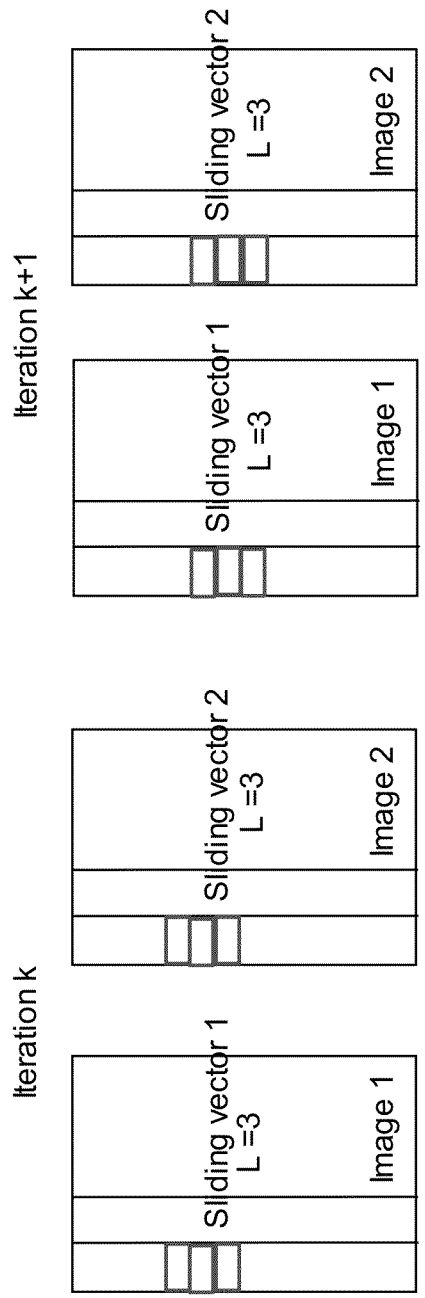
FIG. 6 illustrates a sliding vector employed in the adaptive filtering of FIG. 5, at successive iterations for L=3 in accordance with one embodiment of the invention.

The sliding vectors 32, 34 are obtained from the columns of the image matrices, FIG. 6. The vectors scan both matrices, column by column and with each iteration of the adaptive filter the following pixel value is added to the vector and the trailing pixel value is discarded.

When the vectors 32, 34 are combined in the adaptive filter 36, the most recent pixel value added to the first sliding vector 32 is updated. In the preferred embodiment, the updated pixel is the dot product of the filter coefficients and the L pixel values of the first vector. Any adaptive algorithm (Least Mean Square based, Recursive Least Square based) can be applied and many such algorithms can be found in S. Haykin, "Adaptive filter theory", Prentice Hall, 1996. Preferably, the sign-data LMS described in Hayes, M, Statistical Digital Signal Processing and Modeling, New York, Wiley, 1996 is employed.

The formulae are:

$$x(k)=[x(k), x(k-1) \ldots x(k-L+1)],$$

$$w(k)=[w(k), w(k-1) \ldots w(k-L+1)],$$

$$y(k)=w(k)\cdot x(k),$$

$$e(k)=d(k)-y(k),$$

$$w(k+1)=w(k)+\mu(k)\cdot e(k)\cdot \text{sign}(x(k))=w(k)+\mu(k)\cdot e(k),$$

where $w(k)$ are the filter coefficients calculated within the filter 36, $\mu(k)$ is the step size (fixed or variable), $x(k)$ is the most recent pixel value(s) of the sliding vector 32 from Image 1 (it has always positive values), $d(k)$ is the most recent pixel value(s) of the sliding vector 34 from Image 2, $y(k)$ is the scalar product of the sliding vector 32 and the filter coefficients vector w, $e(k)$ is the error signal computed as the difference between $d(k)$ and $y(k)$.

Other considered variants were:

$$w(k+1)=w(k)+\mu(k)\cdot e(k)\cdot x(k) \text{ (standard LMS) or}$$

$$w(k+1)=w(k)+\mu(k)\cdot e(k)/(1+x(k))$$

The term $1+x(k)$ is used above to avoid the division by zero. Alternatively, the formula:

$$w(k+1) = w(k) + \mu(k)\cdot \frac{e(k)}{x(k)}$$

could be used, with any zero-valued x pixel value replaced with a 1.

In a further variant, the step size $\mu(k)$ is variable as follows:

$$\mu(k)\cdot \frac{1-\alpha}{x(k)}$$

or $$\mu(k) = \frac{1-\alpha}{\max(\beta, x(k))}.$$

So, using the above formula:

$$w(k+1)=w(k)+\mu(k)\cdot e(k)\cdot \text{sign}(x(k))=w(k)+\mu(k)\cdot e(k)$$

this gives:

$$w(k) + \frac{1-\alpha}{x(k)}(d(k)-w(k)\cdot x(k)) =$$

$$w(k) + \frac{d(k)}{x(k)} - w(k) - \alpha\cdot \frac{d(k)}{x(k)} + \alpha\cdot w(k) = \alpha\cdot w(k) + (1-\alpha)\cdot \frac{d(k)}{x(k)}$$

If $\mu(k)=\mu=1-\alpha$, $\alpha$ very close to 1 (e.g. 0.99999), for L=1, we have $$w(k+1) = w(k) + \mu(k) \cdot \frac{e(k)}{x(k)},$$

with vectors being replaced with scalars. Therefore, for this particular fixed step size, the sign-data LMS and the previous equation are equivalent. The β parameter can be used in order to avoid division by zero and to over-amplify any black pixels. β is preferably in the interval [1 ... 10], and preferably in the interval [5 ... 10], particularly if the under-exposed image is too dark. If not, β=1 is enough.

Some thresholds or resetting for the filter coefficients w(k) or output values y(k) can be imposed in order to avoid artifacts in the filtered image 38. An upper threshold, δ, is imposed for the values that can be allowed for the coefficients of w(k) (i.e. $w_i(k)=\delta$ for any i=1 ... L, if its computed value at iteration k is above δ). A suitable threshold value for the mentioned LMS algorithm, can be chosen as $$\delta = 1 + \frac{\overline{b}}{4 \cdot \overline{a}},$$

where $\overline{b}$ and $\overline{a}$ are the average values of above mentioned vectors b and a respectively. Also, the filter output can be forced to be within the [0 255] interval if uint 8 images are used. As can be seen, the updated pixel values y(k) replace the old pixel values x(k) and can be taken into account for the next sliding vectors.

The updated color matrix 38 is completed when the last pixel from the last column has been updated. If filtering has been performed in RGB space, then a final reconstructed image 40 is obtained by concatenating the R/G/B updated matrices. Alternatively, if filtering has been performed in YCC space, the concatenated updated Y plane, i.e. matrix 38, with unchanged Cb and Cr planes of the under-exposed image 10 can be converted back to RGB color space.

The filtering can be repeated with the reconstructed image 40 replacing the under-exposed image, i.e. IMAGE 1.

In this case, adaptive filtering can be performed on the Y plane of an image converted from RGB space, if previous filtering had been performed in RGB space; or alternatively filtering can be performed on an RGB color plane of an image converted from YCC space, if previous filtering had been performed on the Y plane.

It will also be seen that filtering can be operated column wise or row wise. As such, adaptive filtering can be performed first column or row wise and subsequently in the other of column or row wise.

In each case where filtering is repeated, it has been found that the quality of the reconstructed image after two filtering operations is superior than for each individual filtering result.

Figure 5B:
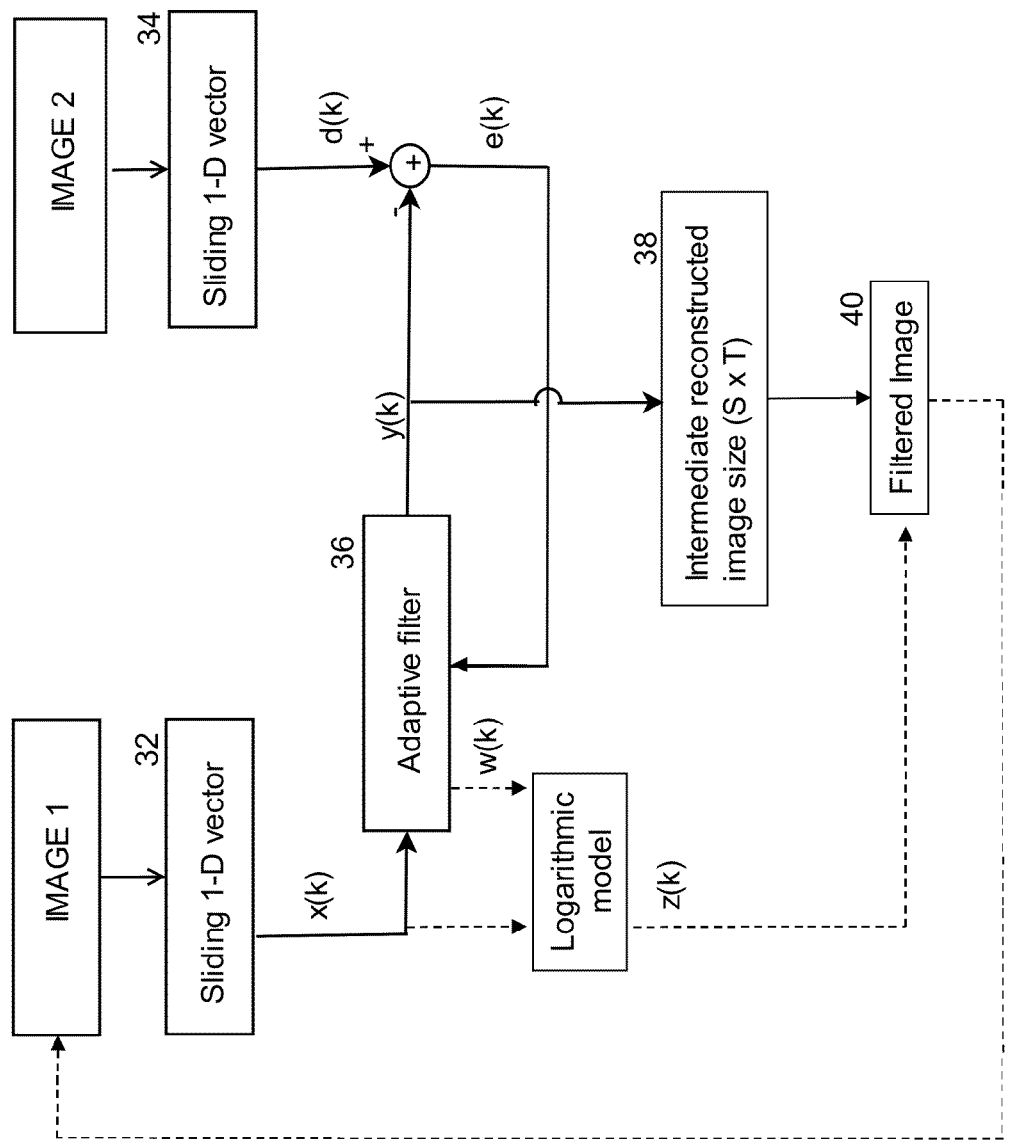

Referring to FIG. 5(b), in some cases saturation problems might appear in the filtered image, especially when the coefficient $c_1$ has a large value (e.g. when using a very dark under-exposed image and very light blurred image). This saturation can be avoided using, for example, techniques described in Jourlin, M., Pinoli, J. C.: "Logarithmic image processing the mathematical and physical framework for the representation and processing of transmitted images" Advances in Imaging and Electron Physics 115 (2001) 129-196; or Deng, G., Cahill, L. W., Tobin, G. R.: "The study of logarithmic image processing model and its application to image enhancement". IEEE Trans. on Image Processing 4 (1995) 506-512.

Therefore, the pixel value of the filtered image z(k) is generated by the following formula:

$$z(k) = D - D\left(1 - \frac{x(k)}{D}\right)^{w(k)}$$

where D is the maximum permitted value (e.g. 255 for a 8 bit representation of images). The adaptive filter provides the first filter coefficient w(k) computed using the error signal e(k). Another alternative to reduce saturation problems is to reduce the value of the step size μ(k).

Figure 7:
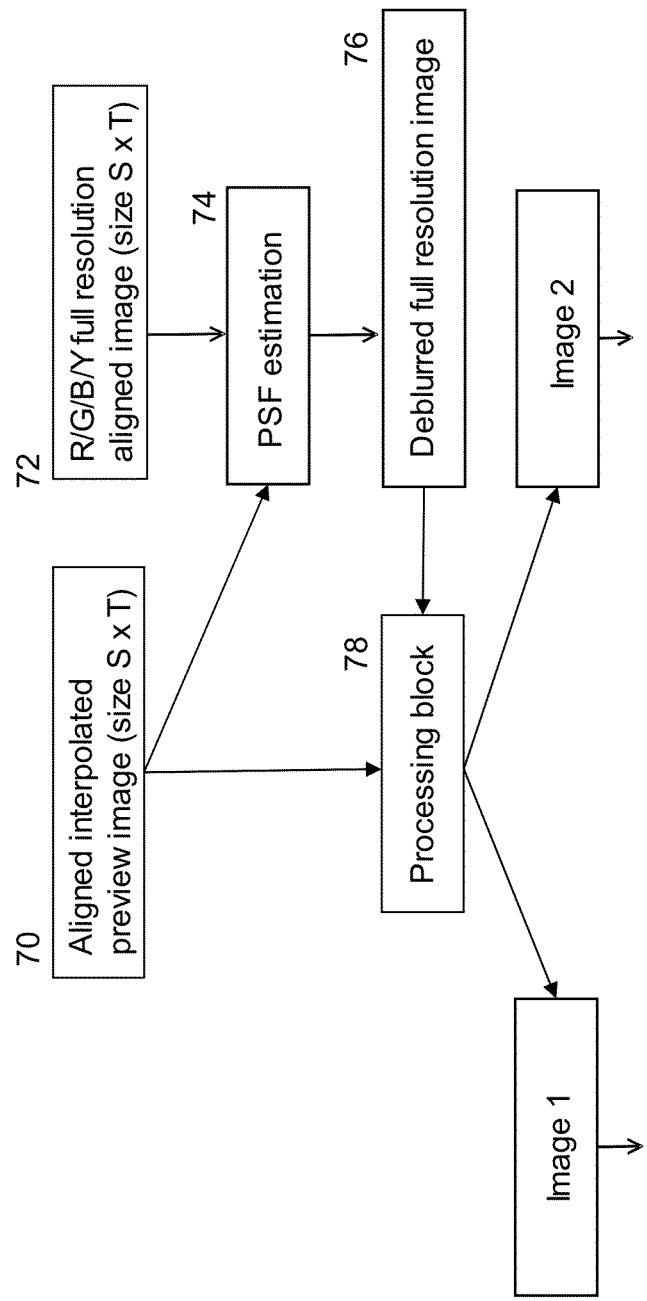
FIG. 7 illustrates a process for effecting image processing in accordance with one embodiment of the invention.

Referring now to FIG. 7, in a second embodiment of the invention, an under-exposed relatively-sharp low resolution image and a full resolution blurred image 72 are available. The low resolution image, for example, a preview image as before, is interpolated and aligned with the full resolution image to produce image 70.

A PSF estimation block 74 computes a PSF for the blurred image 72, from the interpolated preview 70 and the full resolution image 72, using any suitable method such as outlined in the introduction.

The blurred 72 image is then deblurred using this estimated PSF to produce a relatively deblurred image 76. Examples of deblurring using a PSF are disclosed in "Deconvolution of Images and Spectra" 2nd. Edition, Academic Press, 1997, edited by Jannson, Peter A. and "Digital Image Restoration", Prentice Hall, 1977 authored by Andrews, H. C. and Hunt, B. R.

Prior to adaptive filtering, the average luminance of the interpolated preview image 70 is equalized in processing block 78 with that of the full resolution (relatively) deblurred image 76. Preferably, this comprises a gamma (γ) amplification of the under-exposed image. The exact value of gamma is determined by obtaining a ratio of average luminance ($\overline{Y}$ in YCC format) for the blurred full resolution and the preview image, and then using this ratio as an index for a look-up table to return γ.

The deblurred full resolution image 76 is then chosen as IMAGE 2 and the interpolated/aligned/luminance equalized preview image produced by the processing block 78 is chosen as IMAGE 1.

Adaptive filtering is then applied and re-applied if necessary to IMAGE 1 and IMAGE 2 as in the first embodiment. Again when repeating adaptive filtering, the under-exposed image, i.e. IMAGE 1 is replaced with the reconstructed one.

In the second embodiment, the quality of the reconstructed image 76 produced by adaptive filtering may not be good enough, especially if the PSF is relatively large. In such cases, de-blurring using the PSF may not be used, because can it introduce significant ringing.

In cases such as this, re-applying adaptive filtering as in the first embodiment can attenuate the blurring artifacts in the original image 72 and improve the quality of the image to some extent.

Again, the adaptive filtering can be performed on Y plane if RGB filtering had been performed previously and on the RGB color space if Y filtering had been performed previously.

Again, filtering can be operated on columns or rows, and sequentially on columns and rows.

It has also been found that the second embodiment is useful, if the ratio between the full resolution image 72 and the preview image sizes is less than three and the preview image is not too noisy. If this is not the case, the filtered image can have a lower quality than that obtained by deblurring the blurred image with a very good PSF estimation such as described in the introduction.

In both of the above embodiments, a single preview image is described as being interpolated to match the resolution of the full resolution image. However, it will also be appreciated that super-resolution of more than 1 preview image, nominally of the same scene, could also be used to generate the interpolated images 14, 70 of the first and second embodiments.

In the above embodiments and in particular in relation to the second embodiment, the short-exposure time (presumed sharp) image is described as comprising a preview image acquired either soon before or after acquisition of a main high resolution image.

However, in a further refined embodiment, the two images are acquired within the longer time period of acquisition of the relatively blurred image. In a preferred implementation of this embodiment, an image acquisition device including a CMOS sensor which allows for a non-destructive readout of an image sensor during image acquisition is employed to acquire the images.

Figure 8:
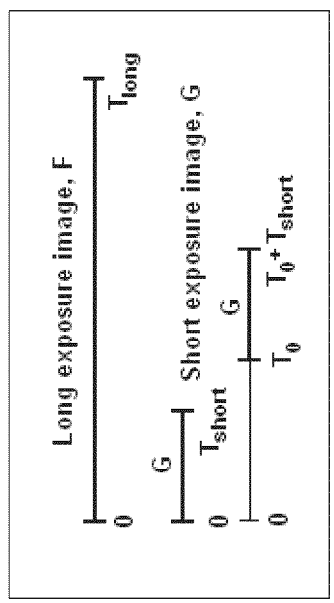
FIG. 8 illustrates an image acquisition timing diagram in accordance with one embodiment of the invention.

A schematic representation of the timing involved in acquiring these images is explained in relation to FIG. 8. For a dark scene, the exposure time $T_{long}$ required to expose the image F properly can result in motion blur caused by hand jitter. Nonetheless, using a non-destructive sensor, it is possible to have an intermediate reading at $T_{short}$ providing an under-exposed (noise prone), but sharp image G.

In the preferred embodiment, the read-out of the under-exposed image is placed mid-way through the longer exposure period, i.e. between $T_0$ and $T_0+T_{short}$. As such, the actual exposing scheme goes as follows:

At t=0 start exposing
At t=$T_0$ take the first readout to obtain G'
At t=$T_0+T_{short}$ take the second readout to obtain G"
The short exposed image is G=G'−G"
At t=$T_{long}$ take the third (last) readout to obtain the well-exposed frame, F.
Reset the image sensor.

This means that statistically, the chances of content differences between the short exposure and the long exposure images G and F are minimized. Again, statistically, it is therefore more likely that the differences are caused only by the motion existing in the period [0, $T_{long}$]. The well exposed picture is blurred by the motion existing in its exposure period, while the other is not moved at all, i.e. the motion blur makes the content differences.

Figure 9:
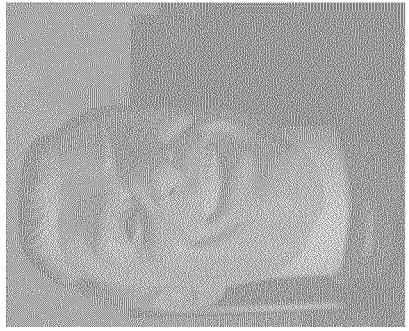
FIG. 9 illustrates example image data produced during the image acquisition described in reference to FIG. 8.
Figure 9:
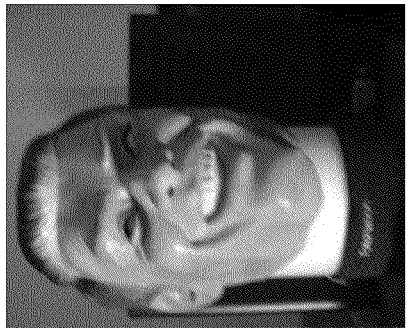
Figure 9:

Referring now to FIG. 9, a still image of a scene is recorded. The period $T_0$ is chosen to be long enough so that motion appears in the image G' read at time $T_0$, FIG. 9(c). The values of the PSF for this image are shown in FIG. 9(a). From $T_0$ to $T_{short}$ there is not enough time for extra motion to appear. However, the entire interval, [0; $T_0+T_{short}$], is long enough so that the resulting image G", FIG. 9(d), will be blurred as can be seen from the corresponding PSF values of FIG. 9(b). The resulting under-exposed image, G=G"−G', FIG. 9(e), is not blurred as can be seen from the small difference between the PSF values for the original images G" and G'.

The image G can now be combined with the image F through adaptive filtering as described above and in particular in relation to the second embodiment, luminance enhancement can be performed on the image G before being combined with the image F.

Subsequent to producing the filtered image 40 through one or more steps of adaptive filtering, the filtered image can be subjected to further processing to improve its quality further.

The noise correction of the filtered image can be performed using a modified version of the Lee Least mean square (LLMSE) filter. In the following example, $G_1$ is the filtered image, $G_1^x$ is the convolution of $G_1$ with an X×X uniform averaging kernel; so $G_1^3$ is the convolution of $G_1$ with a 3×3 uniform averaging kernel; and $G_1^7$ is the convolution of $G_1$ with a 7×7 uniform averaging kernel.

The noise cleared picture is: $G_2=\alpha G_1^x+(1-\alpha)G_1$
where $$\alpha = \frac{s_n}{s_n + s_F}$$

$S_{G1}$ is the filtered image standard deviation computed for a 5×5 vicinity of a pixel;
$S_F$ is the well-exposed image squared standard deviation computed for a 3×3 vicinity of the corresponding pixel; and $S_n=|S_F-S_{G1}|$ If $S_F$ is smaller than a predetermined threshold (meaning that the current pixel in a perfectly uniform area) then $G_1^x=G_1^7$ otherwise (in the current pixel neighborhood there is an edge) $G_1^x=G_1^3$. It will therefore be seen that where the variation around a pixel is high, $G_2$ is approximately equal to $G_1$.

As discussed, the under-exposed acquired image has intensities in the lower part of the range (darkness range). The spectral characteristics of the cameras, in this area, differ from those of normally exposed areas. Therefore, the adaptively filtered image, $G_1$ or $G_2$, depending on whether noise filtering has been applied or not, may have deviations in color. To compensate for these deviations, a rotation or a translation in the (Cb,Cr) plane can be applied. The parameter values for these operations will depend on the camera and number of exposure stops between the well-exposed and the under-exposed images. One exemplary scheme for color correction in RBG space is as follows:

Compute the average luminance: ($\overline{Y_F}$, $\overline{Y_{G2}}$)
Compute the color averages ($\overline{R_F}$, $\overline{R_{G2}}$, $\overline{Gr_F}$, $\overline{Gr_{G2}B_F}$, $\overline{B_{G2}}$)
Correct $G_2$ to obtain $G_3$ as follows:

$\Delta R=(\overline{R_{G2}}-\overline{Y_{G2}})+(\overline{Y_F}-\overline{R_F}); R_{G3}(i,j)=R_{G2}(i,j)-\Delta R$ $\Delta Gr=(\overline{Gr_{G2}}-\overline{Y_{G2}})+(\overline{Y_F}-\overline{Gr_F}); Gr_{G3}(i,j)=Gr_{G2}(i,j)-\Delta Gr$ $\Delta B=(\overline{B_{G2}}-\overline{Y_{G2}})+(\overline{Y_F}-\overline{B_F}); B_{G3}(i,j)=B_{G2}(i,j)-\Delta B$ with $\forall (i,j) \in [1,M]\times[1,N]$ General Matters Embodiments of the invention include apparatuses and methods for effecting image processing. Embodiments of the invention have been described above with various specific details. It will be appreciated that such details are examples and may be modified.

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An image acquisition and processing apparatus including a lens and image sensor for acquiring digital images and a processor arranged to acquire and process a first image of a scene that is relatively underexposed and sharp compared with a second relatively well exposed and blurred image also acquired by the apparatus, of approximately the same scene, the first and second images being derived from respective image sources, the apparatus comprising:

means for providing a first image portion of the relatively underexposed first image as an input signal to an adaptive filter;

means for providing a corresponding second image portion of the relatively well exposed second image as a desired signal to the adaptive filter;

the adaptive filter arranged to produce an output signal from the input signal and the desired signal, the adaptive filter being arranged to add a coefficient to the input signal, the output signal being calculated from values of the input signal and the desired signal; and an image generator arranged to construct a first filtered image from the output signal, relatively less blurred than the second image, and wherein the first image and the second image are in RGB format and wherein the first image and the second image portion comprise a respective color plane of the first image and the second image, and wherein the adaptive filter and image generator are configured to apply the color plane of the relatively well-exposed, blurred second image to the color plane of the relatively underexposed, sharp first image to enhance the color plane of the first image to construct the first filtered image.

2. One or more tangible, non-transitory processor readable media having code embodied therein for programming one or more processors to perform an image processing method, wherein the method comprises:

obtaining a first image and a second image of approximately a same scene, the first image being a relatively underexposed, sharp image of the scene compared with the second image, the second image comprising a relatively well exposed, blurred image compared with the first image, the first image and the second image being derived from respective image sources;

providing a first image portion of the first relatively underexposed image as an input signal to an adaptive filter;

providing a corresponding second image portion of the relatively well exposed second image as a desired signal to the adaptive filter;

adaptively filtering the input signal to produce an output signal, including adding a coefficient to the input signal, the output signal being calculated from values of the input signal and the desired signal; and constructing a first filtered image from the output signal, relatively less blurred than the second image, and wherein the first image and the second image are in RGB format and wherein the first image and the second image portion comprise a respective color plane of the first image and the second image, and wherein the adaptively filtering and constructing of the first filtered image comprise applying the color plane of the relatively well-exposed, blurred second image to the color plane of the relatively underexposed, sharp first image to enhance the color plane of the first image to construct the first filtered image.

3. The one or more tangible, non-transitory processor readable media according to claim 2 wherein the adaptively filtering includes producing a set of filter coefficients from a combination of the input signal and an error signal, the error signal being a difference between the desired signal and the output signal; and further comprising: constructing each color plane of the first filtered image from a combination of the set of filter coefficients and color plane information of the input signal.

4. The one or more tangible, non-transitory processor readable media according to claim 2, wherein the method comprises:

providing a third image portion of the first filtered image as a further input signal to the adaptive filter;

providing a corresponding fourth image portion of the second image as a desired signal to the adaptive filter;

further adaptively filtering the further input signal to produce a further output signal;

constructing a further filtered image from the further output signal relatively less blurred than the first filtered image.

5. The one or more tangible, non-transitory processor readable media according to claim 4 wherein:

the first image and the second image are in RGB format and, for producing the first filtered image, the first image portion and the second image portion comprise a respective color plane of the first image and the second image;

the providing the third image portion of the first filtered image comprises converting the first filtered image to YCC format to result in a first filtered YCC image;

the method further comprises converting the second image to YCC format to result in a second YCC image; and wherein the third image portion and the fourth image portion for further adaptive filtering comprise a respective Y plane of the first filtered YCC image and the second YCC image.

6. One or more tangible, non-transitory processor readable media having code embodied therein for programming one or more processors to perform an image processing method, wherein the method comprises:

obtaining a first image and a second image of approximately a same scene, the first image being a relatively underexposed, sharp image of the same scene compared with the second image, the second image comprising a relatively well exposed, blurred image compared with the first image, the first image and the second image being derived from respective image sources;

providing a first image portion of the first image as an input signal to an adaptive filter;

providing a corresponding second image portion of the second image as a desired signal to the adaptive filter;

adaptively filtering the input signal to produce an output signal, including adding a coefficient to the input signal, the output signal being calculated from values of the input signal and the desired signal; and constructing a first filtered image from the output signal, relatively less blurred than the second image, and wherein the first image and the second image are in YCC format and wherein the first image portion and the second image portion comprise a respective Y plane of the first image and the second image, and wherein the adaptively filtering and constructing of the first filtered image comprise applying the Y plane of the relatively well-exposed, blurred second image to a color plane of the relatively underexposed, sharp first image to enhance the Y plane of the first image to construct the first filtered image.

7. The one or more tangible, non-transitory processor readable media according to claim 6 wherein the constructing the first filtered image comprises using the output signal as a Y plane of the first filtered image and using Cb and Cr planes of the input signal as the Cb and Cr planes of the first filtered image.

8. The one or more tangible, non-transitory processor readable media according to claim 6 further comprising:

providing a third image portion of the first filtered image as a further input signal to the adaptive filter;

providing a corresponding fourth image portion of the second image as a further desired signal to the adaptive filter;

further adaptively filtering the further input signal to produce a further output signal; and constructing a further filtered image from the further output signal relatively less blurred than the first filtered image, and wherein the first image and the second image are in YCC format and, for producing the first filtered image, the first image portion and the second image portion comprise a respective Y plane of the first image and the second image;

the providing the third image portion of the first filtered image comprises converting the first filtered image to RGB format to result in a first filtered RGB image;

the method further comprises converting the second image to RGB format to result in a second RGB image; and wherein the third image portion and the fourth image portion for further adaptive filtering comprise a respective color plane of the first filtered RGB image and the second RGB image.

9. A digital image acquisition device, comprising:
a lens and image sensor for acquiring digital images;
a processor;
a memory having processor readable code embodied therein for programming one or more processors to perform an image processing method, wherein the method comprises:

obtaining a first image and a second image of approximately a same scene, the first image being a relatively underexposed, sharp image of the same scene compared with the second image, the second image comprising of a relatively well exposed, blurred image of the same scene compared with the first image, the first image and the second image being derived from respective image sources;

providing a first image portion of the first image as an input signal to an adaptive filter;

providing a corresponding second image portion of the second image as a desired signal to the adaptive filter;

adaptively filtering the input signal to produce an output signal, including adding a coefficient to the input signal, the output signal being calculated from values of the input signal and the desired signal; and constructing a first filtered image from the output signal, relatively less blurred than the second image, and wherein the first image and the second image are in RGB format and wherein the first image portion and the second image portion comprise a respective first color plane of the first image and a second color plane of the second image, and wherein the adaptively filtering and constructing of the first filtered image comprise applying the second color plane of the relatively well-exposed, blurred second image to the first color plane of the relatively underexposed, sharp first image to enhance the first color plane of the first image to construct the first filtered image.

10. The device according to claim 9 wherein the adaptively filtering includes producing a set of filter coefficients from a combination of the input signal and an error signal, the error signal being a difference between the desired signal and the output signal; and further comprising: constructing each color plane of the first filtered image from a combination of the set of filter coefficients and color plane information of the input signal.

11. The device according to claim 9, wherein the method comprises:

providing a third image portion of the first filtered image as the input signal to the adaptive filter; providing a corresponding fourth image portion of the second image as a first further desired signal to the adaptive filter;

further adaptively filtering the input signal to produce a first further output signal;

constructing a first further filtered image from the first further output signal relatively less blurred than the first filtered image.

12. The device according to claim 11 wherein:
the first image and the second image are in RGB format and, for producing the first filtered image, the first image portion and the second image portion comprise respective the first color plane of the first image and the second color plane of the second image;

the providing the third image portion of the first filtered image comprises converting the first filtered image to YCC format to result in a first YCC image;

the method further comprises converting the second image to YCC format to result in a second YCC image; and wherein the third image portion and the fourth image portion for further adaptive filtering comprise a respective Y plane of the first YCC image and the second YCC image.

13. The device according to claim 11 wherein the method comprises:

providing a fifth image portion of the first filtered image as a second further input signal to the adaptive filter;

providing a corresponding sixth image portion of the second image as a second further desired signal to the adaptive filter;

further adaptively filtering the second further input signal to produce a second further output signal; and constructing a second further filtered image from the second further output signal relatively less blurred than the first filtered image, and for producing the first filtered image, the first image portion and the second image portion comprise a respective Y plane of the first image and the second image; and the providing the fifth image portion of the first filtered image comprises converting the first filtered image to RGB format to result in a first filtered RGB image; and the method further comprises converting the second image to RGB format to result in a second RGB image; and wherein the fifth image portion and sixth image portion for further adaptive filtering comprise a respective color plane of the first filtered RGB image and the second RGB image.

14. A digital image acquisition device, comprising:

a lens and image sensor for acquiring digital images;

a processor;

a memory having processor readable code embodied therein for programming one or more processors to perform an image processing method, wherein the method comprises:

obtaining a first image and a second image of approximately a same scene, the first image being a relatively underexposed, sharp image of the same scene compared with the second image, the second image comprising of a relatively well exposed, blurred image of the same scene compared with the first image, the first image and the second image being derived from respective Image sources;

providing a first image portion of the first relatively underexposed image as an input signal to an adaptive filter;

providing a corresponding second image portion of the second relatively well exposed image as a desired signal to the adaptive filter;

adaptively filtering the input signal to produce an output signal, including adding a coefficient to the input signal, the output signal being calculated from values of the input signal and the desired signal; and constructing a first filtered image from the output signal, relatively less blurred than the second image, and wherein the first image and the second image are in YCC format and wherein the first image portion and the second image portion comprise a respective Y plane of the first image and the second image, and wherein the adaptively filtering and constructing of the first filtered image comprise applying the Y plane of the relatively well-exposed, blurred second image to a color plane of the relatively underexposed, sharp first image to enhance the Y plane of the first image to construct the first filtered image.

15. The device according to claim 14 wherein the constructing the first filtered image comprises using the output signal as a Y plane of the first filtered image and using Cb and Cr planes of the input image as the Cb and Cr planes of the first filtered image.

\* \* \* \* \*